(12) United States Patent
De Almeida

(10) Patent No.: US 6,678,954 B2
(45) Date of Patent: *Jan. 20, 2004

(54) METHODS TO SET A HOLLOW DEVICE INTO AND TO RETRIEVE SAID HOLLOW DEVICE FROM A FLOW PIPE

(75) Inventor: Alcino Resende De Almeida, Rio de Janeiro (BR)

(73) Assignee: Petroleo Brasileiro S.A. - Petrobras (BR)

( * ) Notice: Subject to any disclaimer, the term of this patent is extended or adjusted under 35 U.S.C. 154(b) by 29 days.

This patent is subject to a terminal disclaimer.

(21) Appl. No.: 09/878,275

(22) Filed: Jun. 12, 2001

(65) Prior Publication Data

US 2002/0100590 A1 Aug. 1, 2002

(30) Foreign Application Priority Data

Jan. 30, 2001 (GB) .............................................. 0102331

(51) Int. Cl.[7] .............................................. B21D 51/16
(52) U.S. Cl. ............................ 29/890.124; 29/890.126; 29/890.12; 405/184.1; 405/154.1
(58) Field of Search ...................... 405/154.1, 184.1; 29/890.12, 890.124, 890.126

(56) References Cited

U.S. PATENT DOCUMENTS

| 3,086,167 A | 4/1963 | Chaney |
| 3,232,090 A | 2/1966 | Walker |
| 3,656,552 A | 4/1972 | Pollock |
| 3,659,305 A | * 5/1972 | Powers .................. 15/104.061 |
| 4,355,686 A | 10/1982 | Arendt |
| 4,491,018 A | 1/1985 | Stringer |
| 5,113,544 A | 5/1992 | Webb |
| 5,117,915 A | 6/1992 | Mueller |
| 5,716,672 A | * 2/1998 | Toyoda et al. .................. 427/8 |
| 5,853,629 A | * 12/1998 | Toyoda et al. ................. 264/35 |
| 6,041,803 A | 3/2000 | De Almeida |
| 6,062,264 A | * 5/2000 | Dickson ....................... 138/98 |
| 6,102,624 A | * 8/2000 | Delaforce .................... 405/184 |
| 6,434,825 B1 | * 8/2002 | De Almeida ............. 29/890.12 |

FOREIGN PATENT DOCUMENTS

| DE | 4240678 | * 6/1994 | |
| EP | 0 581 616 | 2/1994 | |
| GB | 2 230 060 | 10/1990 | |
| GB | 2274699 A | * 8/1994 | ........... F16L/58/02 |
| GB | 2341 695 | 3/2000 | |
| JP | 2002200465 A | * 7/2002 | ........... B08B/9/053 |
| WO | WO 95 33952 | 12/1995 | |

* cited by examiner

Primary Examiner—J. J. Swann
Assistant Examiner—Katherine Mitchell
(74) Attorney, Agent, or Firm—Nixon & Vanderhye PC

(57) ABSTRACT

A method to set a hollow device into an undersea flow pipe uses a flexible pig 5 driven by a flow flowing into the flow pipe to displace a hollow device to a point where a stop halts a displacement of hollow device, thereby setting hollow device into position. A method to retrieve a hollow device from an undersea flow pipe uses a flexible pig driven by a flow flowing into flow pipe to retrieve hollow device from a location where hollow device operates.

22 Claims, 5 Drawing Sheets

METHODS TO SET A HOLLOW DEVICE INTO AND TO RETRIEVE SAID HOLLOW DEVICE FROM A FLOW PIPE

FIELD OF THE INVENTION

The present invention relates to a method of setting and a method of retrieving a device in a flow pipe. More particularly, the present invention relates to a method for setting into an undersea flow pipe a device which is provided with an opening to allow the flow to pass therethrough.

STATE OF THE ART

Pipes are widely used in the industry to transport diverse kinds of fluids. Such fluids may comprise a single constituent or multiple constituents, they may comprise a single phase or multiple phases, and they may be highly compressible or they may be almost not compressible. Such pipes may be provided with varying internal diameters and configurations. In the oil industry the pipes, or flow pipes, as they are usually referred to, are used to promote the flow of fluids from oil producing wells to gathering centers, where the fluids are processed.

When an undersea oil field is commercially exploited, it is necessary for the production from the oil producing wells to flow through pipes to a production unit located at the surface. An undersea flow pipe in usually connected at one end to an oil producing well and lies down on the sea bed but is connected at its other end to an undersea flow riser, which carries the fluids to the production unit at the surface.

Situations may occur in which it is necessary to insert a hollow device into the undersea flow pipe, in a certain location. Such device can for example be a body, externally shaped to match the inside of a portion of the undersea flow pipe where it is to be located with an orifice of any shape extending longitudinally therethrough so as to provoke a constriction in the flow.

The object of the insertion of such device into the undersea flow pipe may be, for example, to introduce a constriction in the flow to control the features of this flow, or to introduce an element intended to be used in flow rate measuring operations. In the oil industry situations occur in which there is the need to control the phenomenon known as severe slugging, which may occur in production systems provided with descending flow pipes followed by flow risers.

The severe slugging phenomenon is characterized by intense oscillations in the pressure and flow rate levels occurring in a multiphase flow having a gaseous phase. The severe slugging phenomenon causes disturbances to the undersea production activities, which can seriously impair or even shut the oil production down.

GB 2 341 695, commonly owned by the applicants of the present patent application, discloses a device used to control the severe slugging phenomenon. A hollow device, preferably a venturi, is installed into a descending undersea flow pipe relatively close to the junction to a flow riser.

The design of new undersea flow pipe may anticipate the need of such hollow device, which can be installed during the deployment of the undersea flow pipe. In existing undersea flow pipes where access to the interior of the undersea flow pipe is easy and the oil production flow can be interrupted, the hollow device can be installed after cutting the undersea flow pipe, the integrity of the undersea flow pipe being reinstated by using any of the known pipe assembling techniques, e.g., welding.

However, besides causing ceasing of profits, shutting down of the production can cause many operational problems, especially in undersea flow pipe under the effects of low temperatures of the sea bed. Many of these undersea flow pipes are located at great depth of sea, hindering the access of divers. A cutting operation in such undersea flow pipe would be very difficult to implement, as it involves the retrieval of the undersea flow pipe from the seabed, or carrying out the operation using a remote operated vehicle, both being extremely expensive, time consuming and complex operations.

Thus, there has been a need to provide a way to install a hollow device as described in GB 2 341 695 in undersea flow pipe without causing the above drawbacks. The present invention propose the use of polymeric foam blocks to set the hollow device in its operational position.

Polymeric foam blocks, usually cylindrical in shape, are widely used to clean the interior of pipes. Generally, one or more polymeric foam blocks are inserted into a pipe which is to be cleaned. Such polymeric foam blocks are usually driven throughout the pipe by the flow of fluids which may or may not be the same kind of fluid which is already flowing in the flow pipe.

In the oil industry such polymeric foam blocks are known as foam pigs, and are widely used, especially for cleaning the inside of gas pipes and oil pipes. EP 0 581 616 A1, of Aug. 2, 1993, commonly owned by the applicants of the present patent application, discloses a process which makes use of a pig to remove deposited liquids from the interior of a pipe.

The foam pigs are usually formed from polyurethane foam, though other material having flexible features may also be used. An important feature of the foam pigs is its extreme ability to adapt itself to changes in the inside diameter of a pipe. Even in pipes having severe constrictions located at certain points, the foam pig proves to be able to pass therethrough.

Thus, having the need to install a hollow device such as the disclosed in GB 2 341 695 in an existing undersea flow pipe, the use of flexible foam pigs is preferred for installing the hollow device in its operational position, as will be seen hereafter.

SUMMARY OF THE INVENTION

The present invention relates to a method of setting a hollow device into a pipeline and a method of retrieving it.

In a first aspect the present invention relates to a method of setting a hollow device into an undersea flow pipe having a flow of fluids flowing in it, the method comprising:

inserting at least one stop means into a position where said hollow device is to operate;

first inserting said hollow device ahead of a driving means into an end of said flow pipe located upstream of a point where said hollow device should operate;

allowing said driving means to be urged by said flow flowing in said flow pipe, thereby displacing said hollow device along said flow pipe;

allowing said at least one stop means to halt the displacement of said hollow device, thereby setting said hollow device into its operating position; and allowing said driving means to pass through a passage into said hollow device, urged by a pressure exerted by said flow.

Preferably said driving means is a flexible pig.

In a second aspect the present invention relates to a method of retrieving a hollow device located in a flow pipe having a flow of fluids flowing in it by at least one stop means provided in said flow pipe, the method comprising:

removing said at least one stop means from the interior of said flow pipe;

inserting a driving means into a first end of said flow pipe located upstream of a point where said hollow device operates;

allowing said driving means to be urged by said flow flowing in said flow pipe; and allowing said driving means to contact said hollow device, thereby displacing it towards a second end of said flow pipe where said driving means and said hollow device can both be retrieved.

Preferably said driving means is a pig.

A third aspect of the invention provides a stop means for halting displacement of a hollow device in an undersea pipe flow, said stop means comprising:

a first flange of a flanged spool able to be welded over an orifice drilled in an outer wall of a said flow pipe at a point where said hollow device will operate, with an internal passage of said spool substantially in registration with said orifice;

a bonnet of a gate valve connected to a second flange of said flanged spool, said bonnet being provided with a stem and with a gate connected to a lower end of said stem, said bonnet having a packing set to seal said stem; and an actuating means connected to a second end of said stem, for driving it;

whereby said actuating means is able to be driven in a first sense to displace said stem, provoking a movement of said gate in a direction from said second end towards said first end of said flanged spool, and in a second sense, contrary to said first sense, for provoking a return movement of said gate.

A fourth aspect of the invention provides a stop means for halting displacement of a hollow device in an undersea pipe flow, said stop means comprising:

a flanged spool having a first flange able to be welded over an orifice drilled in an outer wall of a said flow pipe, at a point where said hollow device will operate, with an internal passage of said spool substantially in registration with said orifice;

a first gate valve having a first flange connected to a second flange of said flanged spool;

a second gate valve having a bonnet connected to a second flange of said first gate valve, said bonnet being provided with a stem and with a gate connected to a first end of said stem, said bonnet having a packing set to seal said stem; and an actuating means connected to a second end of said stem, for driving it;

whereby said actuating means is able to be driven in a first sense, to displace said stem and to provoke a movement of said gate in a direction from said first flange of said flanged spool towards said second flange thereof, and is able to be driven in a second sense, contrary to said first sense, provoking a return movement of said gate.

BRIEF DESCRIPTION OF THE DRAWINGS

The invention will be now described in more details, together with the attached drawings which, for illustration only, accompany the present report, wherein.

DETAILED DESCRIPTION OF THE INVENTION

Figure 1A:
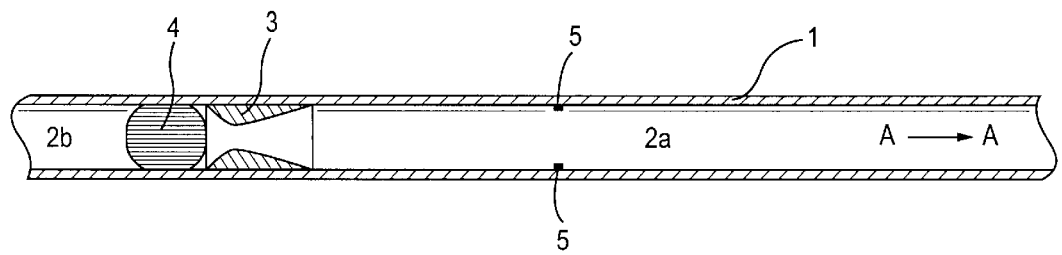
FIG. 1A is a longitudinal section view of an undersea flow pipe depicting the situation in which a foam pig is driving a hollow device.

FIG. 1A is a longitudinal section view of an undersea flow pipe 1. There is a fluid flow 2 into the undersea flow pipe 1, in the direction indicated by the arrow A—A. A foam pig 4 is urged by an upstream portion 2b of the flow 2, located upstream from the foam pig 4.

A hollow device 3 is urged by the foam pig 4, and both, in conjunction, urge a downstream portion 2a of the flow 2. Therefore, the downstream portion 2a is being urged by the upstream portion 2b, which in turn urges the foam pig 4, which urges the hollow device 3. In the present embodiment, for exemplification only, the hollow device 3 is provided with such an internal geometry that its opening is venturi shaped.

The foam pig 4 and the hollow device 3 are inserted into the undersea flow pipe 1 at the end located upstream of the point where the hollow device 3 should operate, by means of a device known in the art.

The downstream and upstream flow portions 2a and 2b may comprise varying kinds of fluids. They may comprise a single component or more than one component. They may comprise one phase or more than one phase; they may comprise varying combinations of phases and components, in each of the fluid portions 2a and 2b or in both; and they can vary along the time.

In the embodiment illustrated, the undersea flow pipe 1 is shown in a horizontal position, for exemplification only, but when in operation, it may be in any orientation. The undersea flow pipe 1 may have different internal diameters and may be formed by different materials. Further, the undersea flow pipe 1 may be subjected to high or low temperatures and pressures.

Figure 1B:
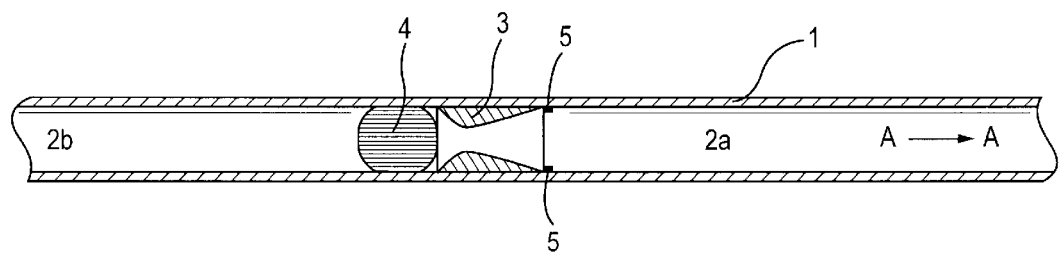
FIG. 1B is a longitudinal section view of an undersea flow pipe depicting the moment when the hollow device is set at its operational position.

In the situation shown in FIG. 1B, the hollow device 3 has just reached a stop means 5, which prevents the hollow device 3 from further movement along the undersea flow pipe 1. Therefore, in a first moment the foam pig 4 is also arrested there.

The retention of the foam pig 4 provokes waves of pressure downstream and upstream from the foam pig 4. The upstream pressure from the foam pig 4 tends to increase, as the sources originating the flow have not stopped operation. As a consequence, the upstream flow from the foam pig 4 tends to apply more pressure against the back portion of the pig.

Figure 1C:
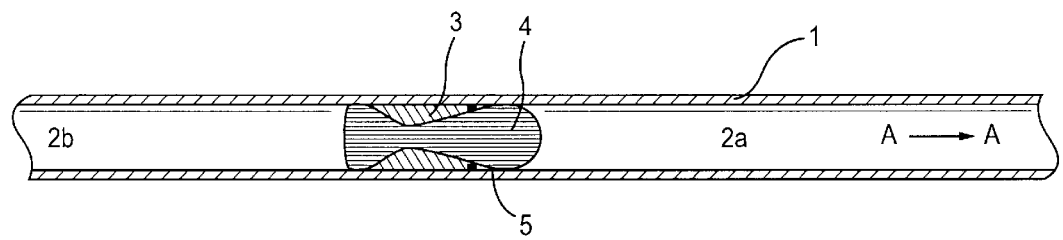
FIG. 1C is a longitudinal section view of an undersea flow pipe depicting the moment when the foam pig starts passing throughout an existing opening in the hollow device, as a result of the rise of the flow pressure acting onto its back portion.

In the situation depicted in FIG. 1C, the back pressure acting on the foam pig 4 reaches a value which forces the foam pig 4 to pass into the opening of the hollow device 3. This is possible because the foam pig used is preferably highly compressible.

Figure 1D:
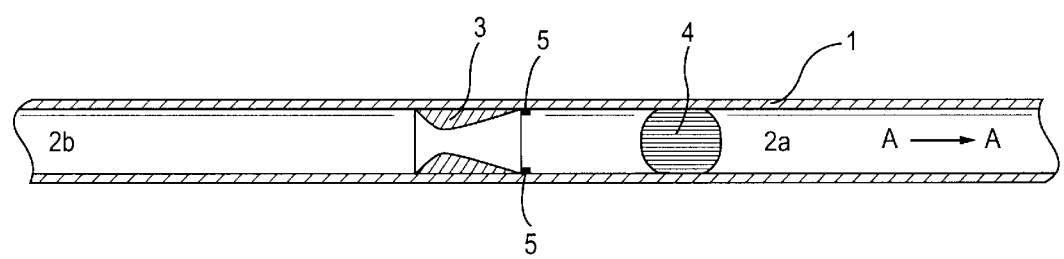
FIG. 1D is a longitudinal sectional view of an undersea flow pipe depicting the situation in which the hollow device is already set and the foam pig is moving towards the other end of the undersea flow pipe, after having passed throughout the opening of the hollow device.

In the situation depicted in FIG. 1D the foam pig 4 has already passed through the opening of the hollow device 3, and continues traveling along the undersea flow pipe 1 for being retrieved in the opposite end to which it was inserted into the undersea flow pipe 1. It is not necessary that the foam pig 4 keeps its physical integrity after having passed throughout the opening of the hollow device 3, and it can be destroyed during the process of passing through the opening.

The procedure herein described for setting a hollow device into a undersea flow pipe may also be cumulatively used, that is, hollow devices can be set in a sequence, either in the same region or in discrete regions.

In the present embodiment the stop means 5 is shown schematically. Such stop means 5 can be inserted at its operational position in the undersea flow pipe 1 before the latter be laid on the seabed, or it can be set in position afterwards. It can be a permanent or a temporary stop. It can have a fixed or variable insertion distance into the pipe.

Figure 3:
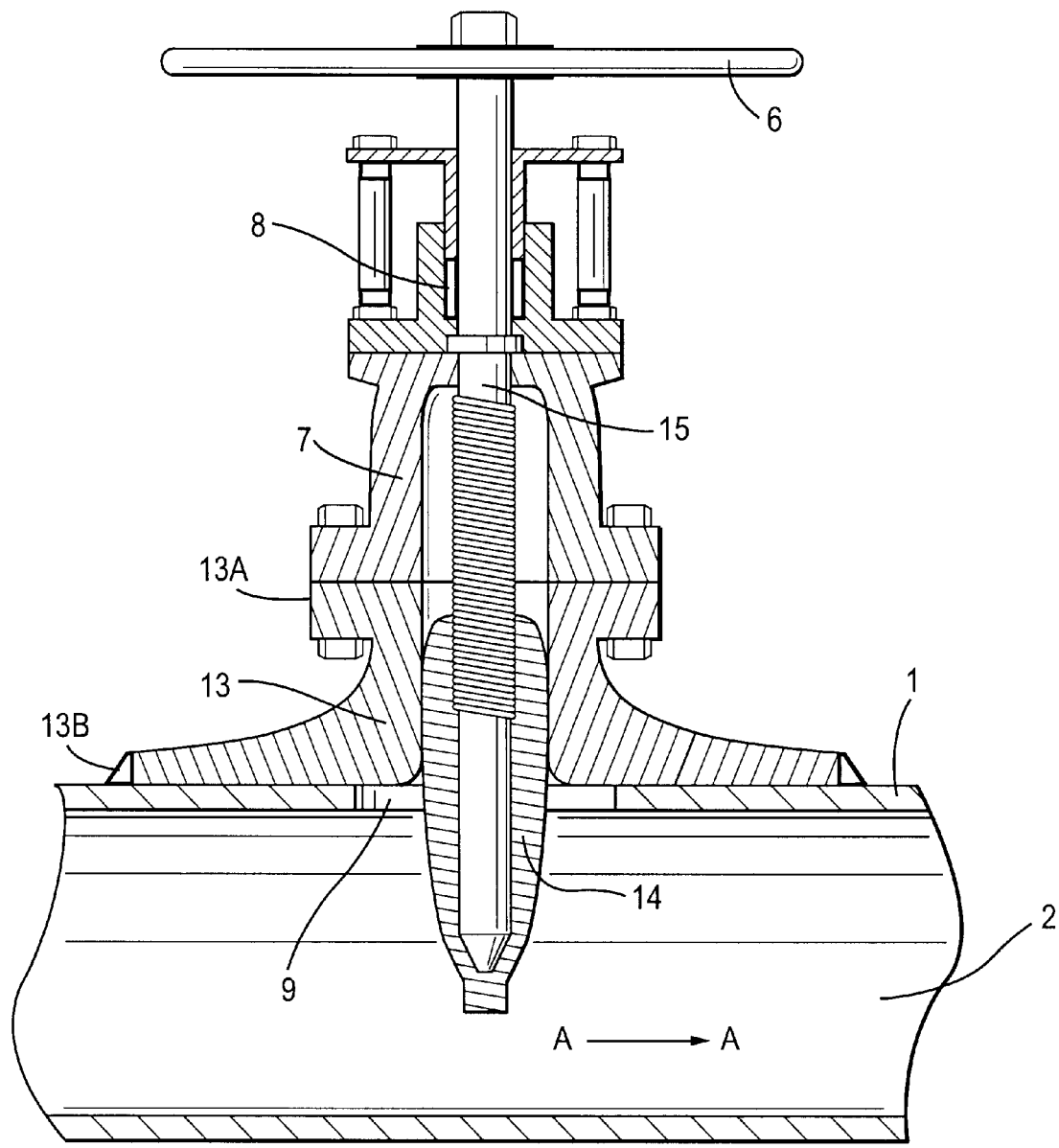
FIG. 3 is a cross sectional view depicting an embodiment of a stop means to halt the displacement of the hollow device into the undersea flow pipe and to keep it in its operational position.

FIG. 3 depicts a first embodiment of a stop means to stop the traveling of the hollow device 3 and to keep it in its operational position. An orifice 9, preferably circular, is drilled in the external wall of the undersea flow pipe 1 at a position where the stop means should operate to stop the traveling of the hollow device 3. Next a lower flange 13B of a flanged spool 13 is welded in the region of the undersea flow pipe 1 where the orifice 9 has been drilled, the internal passage of the spool 13 being substantially in registration with the orifice 9.

A bonnet 7 of a gate valve is connected to the upper flange 13A of the flanged spool 13, as shown in the FIG. 3. The bonnet 7 is provided with a stem 15, and a gate 14 connected to the lower end of the stem 15. A handwheel 6 is connected to the upper end of the stem 15, to drive it. A packing set 8 seals the stem 15.

The above assembly allows the gate 14 to be inserted into the undersea flow pipe 1, and the distance of the projection of the gate 14 is controlled by driving the handwheel 6 in such a way that the stem 15 provokes a downward movement of the gate 14, causing the insertion of the gate 14 into the undersea flow pipe 1 to the desired length.

The gate 14 must be structurally reinforced and must be provided with a support at the flanged spool 13 to resist the impact of the hollow device 3 against it at the moment which the hollow device 3, driven at a relatively high speed by the foam pig 4, contacts the gate 14.

The embodiment of FIG. 3 requires that the flow in the undersea flow pipe 1 is interrupted when the orifice 9 is to be drilled, and the flow may only be restarted after the assembly operation has finished. Modifications and improvements can be made in the embodiment depicted in the FIG. 3 without departing from the general scheme which is shown.

Figure 4:
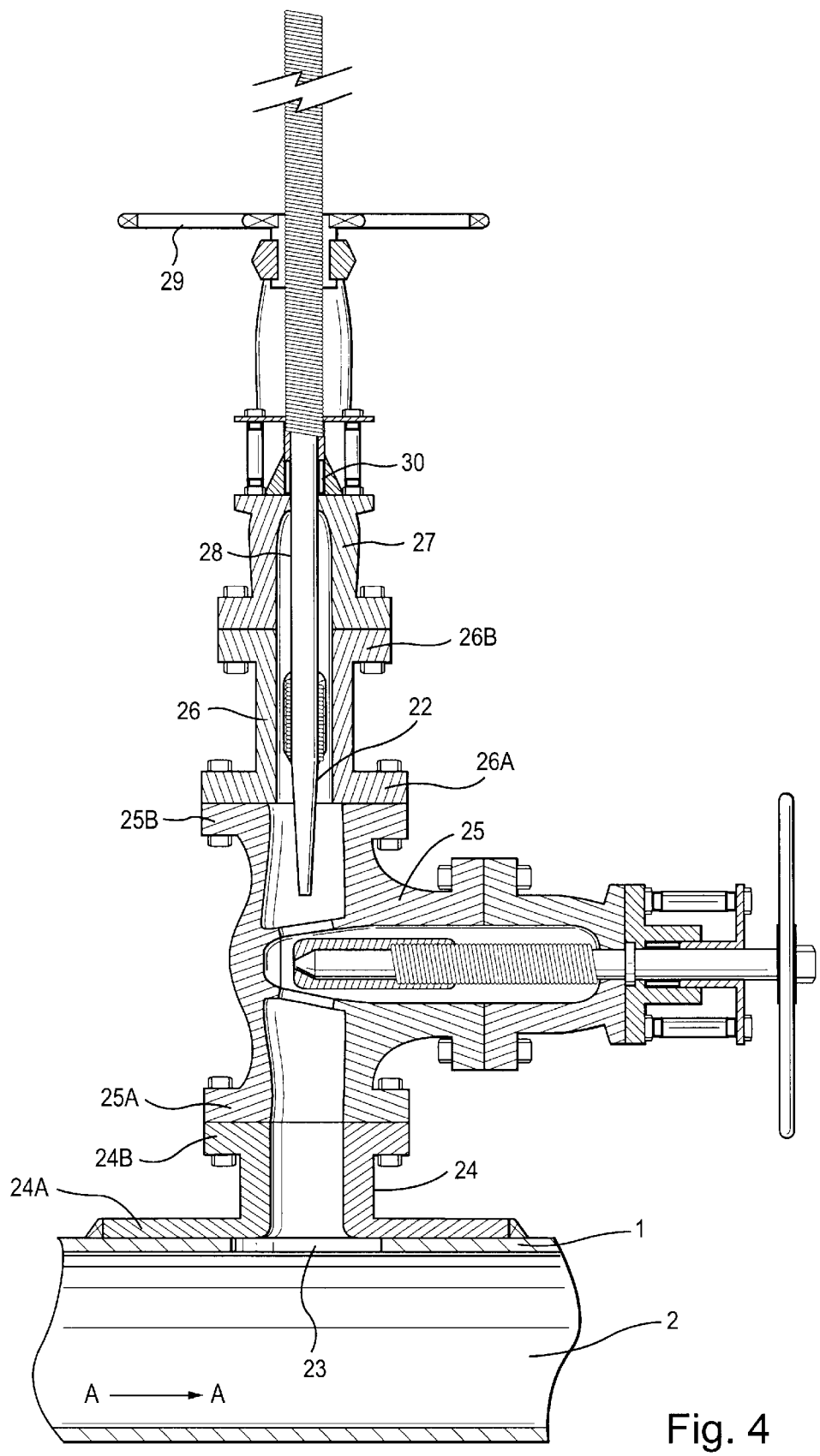
FIG. 4 is a cross sectional view depicting a further embodiment of a stop means to halt the displacement of the hollow device in the undersea flow pipe and to keep it in its operational position.

FIG. 4 depicts a further embodiment of a stop means to stop the displacement of the hollow device 3 into the undersea flow pipe 1 and to keep it into its operational position. This embodiment does not require that the flow is interrupted in order for the stop means to be installed.

As can be seen in FIG. 4, the lower flange 24A of a flanged spool 24 is welded to the external wall of the undersea flow pipe 1 at a position where the stop means for stopping the displacement of the hollow device 3 is supposed to operate. The lower flange 25A of a gate valve 25 is connected (in this case bolted) to the upper flange 24B of the flanged spool 24. The gate valve 25 is in the closed configuration during this part of the assembly operation.

A drilling device (not shown in FIG. 4) may then be connected to the upper flange 25B of the gate valve 25 to prepare for drilling an orifice in the wall of the undersea flow pipe 1 as will be described in the following. Drilling devices as the one mentioned above are widely known in the art and it will not be described herein, as its construction does not form part of the invention.

Next, the gate valve 25 is open and the drilling element of the drilling device passes through the open interior passage of the gate valve 25 and it drills an orifice 23 in the outer wall of the undersea flow pipe 1. After the orifice 23 has been drilled, the drilling element of the drilling device is retrieved and then the gate valve 25 is closed.

The drilling device may then be retrieved, and next the lower flange 26A of a flanged spool 26 is connected to the upper flange 25B of the gate valve 25. Next a bonnet 27 of a gate valve is connected to the upper flange 268 of the flanged spool 26. The bonnet 27 is provided with a stem 28, and a gate 22 which is connected to the lower end of the stem 28. A handwheel 29 is connected to the upper end of the stem 28, to drive it. A packing set 30 seals the stem 28.

The above assembly allows the gate 22 to be inserted into the undersea flow pipe 1 to act as stop means for a hollow device 3 of the type shown in FIGS. 1 and 2. For this purpose the gate valve 25 is open and the handwheel 29 is driven so as to displace the gate 22 downwardly, allowing the gate to pass through the gate valve 25 and the orifice 23, for being inserted into the undersea flow pipe 1.

The distance by which the gate 22 projects into the pipe 1 is controlled by driving the handwheel 29 in such a way that the stem 28 causes the insertion of the gate 22 into the undersea flow pipe 1 to the desired length. The packing set 30 prevents the fluids from the flow 2 flowing in the undersea flow pipe 1 from escaping to the external environment.

The gate 22 must be structurally reinforced and must be provided with a support at the flanged spool 24 to resist the impact of the hollow device 3 against it at the moment which the hollow device 3, driven at a relatively high speed by the foam pig 4, contacts the gate 22.

The embodiment of FIG. 4 does not require interruption of the flow in the undersea flow pipe 1 when the orifice 23 is to be drilled. Modifications and improvements can be made in the embodiment depicted in the FIG. 4 without departing from the general scheme which is shown.

The stop means depicted in FIGS. 3 and 4 may be manually or mechanically driven, they may be remotely or locally controlled, and they can be provided with or without a mechanism to regulate the insertion of the gate.

When it is necessary to halt the displacement of the hollow device 3 along the undersea flow pipe 1, to set it in the desired position, the stop means previously installed would be operated, and the gate would be transversely inserted into the undersea flow pipe 1, forming in the internal wall of the pipe an indentation of a size adequate to arrest the hollow device 3.

One or more stop means can be used along the undersea flow pipe 1. Should more than one stop means be used at the same position in the undersea flow pipe to arrest one and the same hollow device, they should preferably be placed along the same transverse section of the undersea flow pipe 1 in an annular array.

Although use has been made of handwheels 6 and 29 to actuate the gates 14 and 22 of the embodiments of the stop means of the FIGS. 3 and 4, respectively, it should be mentioned that any other type of actuating means can be used. For example, the gates 14 and 22 can be remotely actuated by means of a hydraulic actuating means.

When it is necessary to retrieve the hollow device from the interior of the undersea flow pipe, it suffices to fully retract the stop means, the gate 14, in the case of the embodiment of the FIG. 3, or the gate 22, in the case of the FIG. 4, thereby releasing the hollow device 3.

Figure 2A:
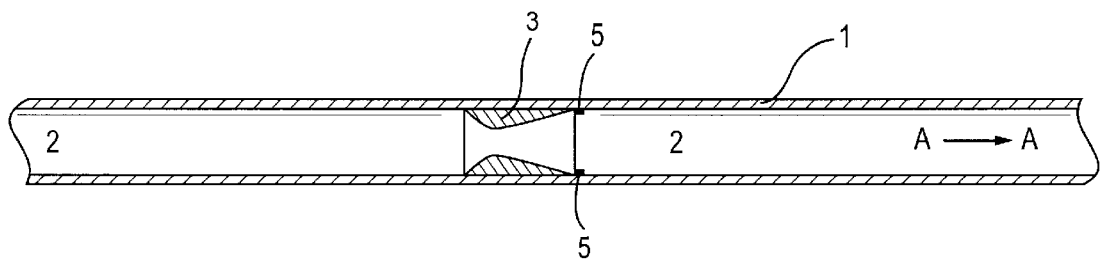
FIG. 2A is a longitudinal sectional view of an undersea flow pipe depicting the moment when the hollow device is released from its operational position.
Figure 2B:
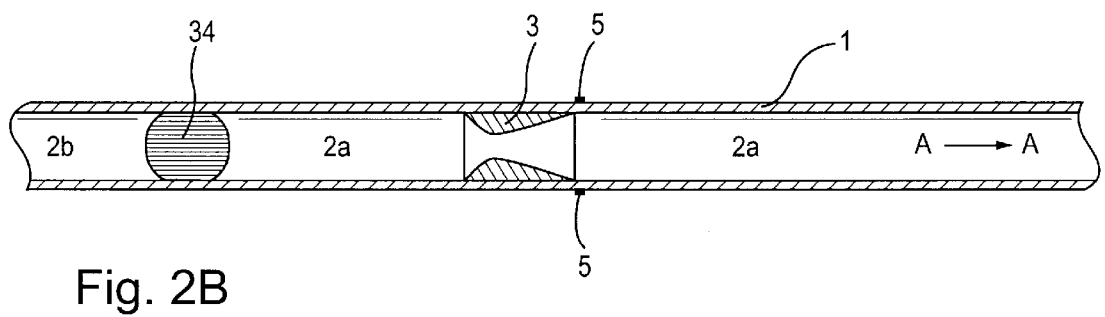
FIG. 2B is a longitudinal sectional view of an undersea flow pipe depicting the situation in which a foam pig, which has previously been inserted into the upstream end of the undersea flow pipe, arrives alongside the hollow device.

FIGS. 2A to 2D depict the retrieval sequence of the hollow device 3 by means of a pig. FIG. 2A depicts a cross section of the undersea flow pipe 1 with a hollow device 3 kept into position by stop means 5. There is a flow in the undersea flow pipe 1, in the direction indicated by the arrow A—A.

First the stop means 5 are removed from the interior of the undersea flow pipe 1, thereby releasing the hollow device 3 to travel along the undersea flow pipe 1, urged by the flow 2. While any stop means can be used here, in the present embodiment the stop means 5 used is preferably either of those depicted in FIGS. 3 and 4. In the case of the stop means of FIG. 4, the gate valve 25 can be closed after the gate 22 has been retrieved, so as to avoid fluid leakage to the interior of the bonnet 27.

If the hollow device 3 remains at its operating position, even if the stop means have been retracted as depicted in FIG. 2, a pig 34 can be inserted into the undersea flow pipe 1 upstream to the hollow device 3. The pig 34 is then urged by the flow towards the hollow device 3.

It should be mentioned here that it is not necessary that the pig used for removing the hollow device 3 from the interior of the undersea flow pipe 1 be a foam pig, as any kind of pig suited for this operation can be used.

Figure 2C:
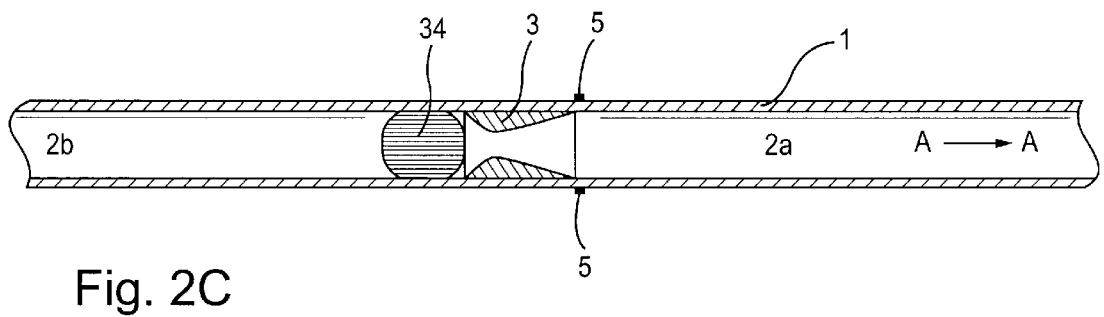
FIG. 2C is a longitudinal sectional view of an undersea flow pipe depicting the moment when the foam pig contacts the hollow device, beginning to retrieve it.
Figure 2D:
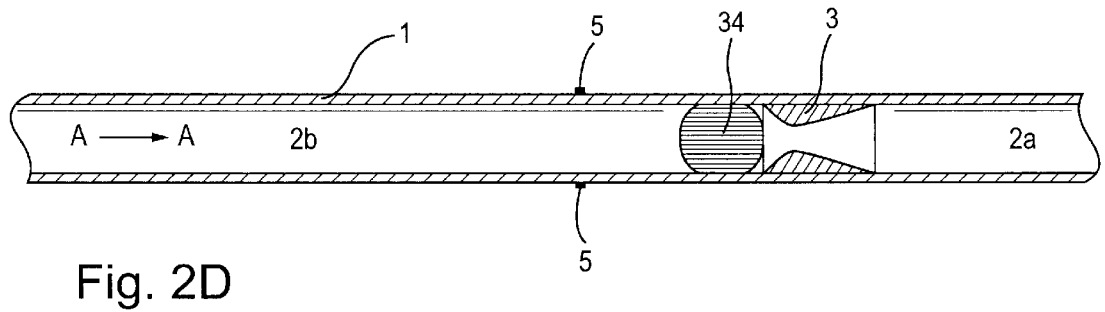
FIG. 2D is a longitudinal sectional view of an undersea flow pipe depicting the beginning of the retrieval of the hollow device by the foam pig shortly after the hollow device has been retrieved from its operational position.

FIG. 2C depicts a situation in which the pig 34 has reached the hollow device 3. As the stop means 5 no longer retain the the hollow device 3 in its operational position it is then urged by the pig 34 towards the other end of the undersea flow pipe 1, as shown in FIG. 2D. The hollow device 3 and the pig 34 can then be retrieved at an adequate place of the undersea flow pipe 1, by means of any retrieval device well known in the art.

The hollow device 3 must be provided with an external sealing system for hindering the flow of fluids along any fortuitous space formed between the external wall of the hollow device 3 and the internal wall of the undersea flow pipe 1.

Figure 5A:
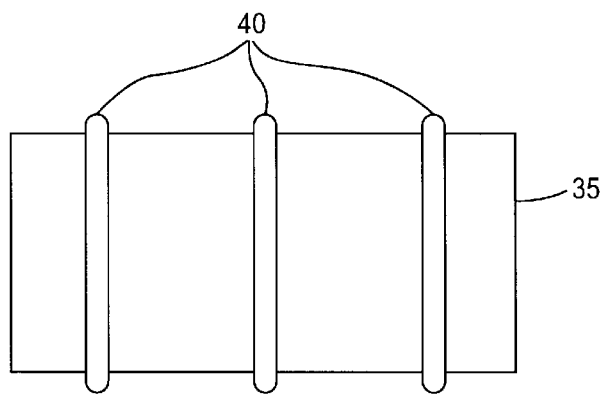
FIG. 5A depicts the external sealing system used on the hollow device.
Figure 5B:
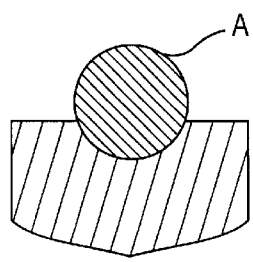
FIGS. 5B, 5C and 5D depict details of cross section shapes of seal rings used in the external sealing system of the hollow device.
Figure 5C:
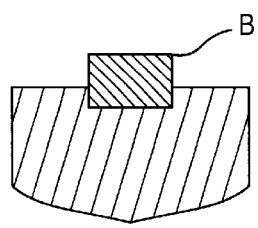
Figure 5D:
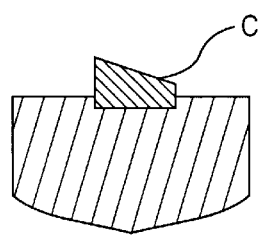

FIG. 5A schematically depicts an embodiment of such a sealing system. Sealing rings 40 are circumferentially arranged along certain portions of the external surface 35 of the hollow device 3. The sealing rings 40 may have any cross sectional shape, some of them being depicted in the details "A", "B" and "C" of FIGS. 5B, 5C and 5D. Other sealing elements such as gaskets and the like may be used instead or in conjunction with the sealing rings 40.

While a foam pig has been proposed herewith to be used for setting a hollow device into its operating position, any other kind of pig, or even other kind of device, can be used, providing that it is able to pass throughout the opening of the hollow device after the device has been set in position.

Those skilled in the art will immediately notice that modifications can be introduced in the methods and in the devices herewith disclosed without departing of the scope an of the spirit of the present invention.

Having described the present invention with respect to its preferred embodiments, it should be mentioned that the above description should not be taken to limit the present invention, which is limited by the scope of the appendant claims.

What is claimed is:

1. A method of setting a hollow device into a flow pipe provided with a flow of fluids flowing in it, said method comprising the following steps:

inserting at least one stop means into a position where said hollow device is to operate;

inserting said hollow device ahead of a driving means into an end of said flow pipe located upstream of a point where said hollow device should operate;

allowing said driving means to be urged by said flow flowing in said flow pipe, thereby displacing said hollow device along said flow pipe;

allowing said at least one stop means to halt the displacement of said hollow device, thereby setting said hollow device into its operating position; and allowing said driving means to pass through a passage into said hollow device, urged by a pressure exerted by said flow flowing in said flow pipe.

2. A method according to claim 1, wherein:

said at least one stop means comprises:

a flanged spool provided with a first flange, said first flange being welded over an orifice drilled in an outer wall of said flow pipe, at a point where said hollow device will operate, with an internal passage of said spool being substantially in registration with said orifice;

a bonnet of a gate valve connected to a second flange of said flanged spool, said bonnet being provided with a stem and being also provided with a gate, said gate being connected to a first end of said stem, said bonnet being also provided with a packing set to seal said stem; and an actuating means connected to a second end of said stem, for driving said stem;

whereby said actuating means is able to be driven in such a way that said stem provokes a movement of said gate radially inwardly of said flow pipe, causing an insertion of said gate into said flow pipe, to a desired length.

3. A method according to claim 2, wherein:

said driving means is a flexible pig.

4. A method according to claim 3, wherein:
said flexible pig is a foam pig.

5. A method according to claim 4, wherein:
said flow pipe is an undersea flow pipe.

6. A method according to claim 5, wherein:
said hollow device is provided with an external sealing system to prevent fluid from passing between a fortuitous space formed between an external wall of said hollow device and an internal wall of said flow pipe.

7. A method according to claim 1, wherein:
said at least one stop means comprises:
- a flanged spool provided with a first flange, said first flange being welded over an orifice drilled in an outer wall of said flow pipe, at a point where said hollow device will operate, with an internal passage of said spool being substantially in registration with said orifice;
- a first flange of a first gate valve connected to a second flange of said flanged spool;
- a bonnet of a second gate valve connected to a second flange of said first gate valve, said bonnet being provided with a stem and being also provided with a gate, said gate being connected to a first end of said stem, said bonnet being provided with a packing set to seal said stem; and
- an actuating means connected to a second end of said stem, for driving said stem;
- whereby said first gate valve can be opened and said actuating means is able to be driven in such a way that said stem provokes movement of said gate of said second gate valve radially inwardly of said flow pipe, causing an insertion of said gate into said flow pipe, to a desired length.

8. A method according to claim 7, wherein said orifice is drilled after welding of said flanged spool on an exterior of said flow pipe, by means of a drilling means passing through said flanged spool.

9. A method according to claim 8, wherein:
said driving means is a flexible pig.

10. A method according to claim 9, wherein:
said flexible pig is a foam pig.

11. A method according to claim 10, wherein:
said flow pipe is an undersea flow pipe.

12. A method according to claim 11, wherein:
said hollow device is provided with an external sealing system to prevent fluid from passing between a fortuitous space formed between an external wall of said hollow device and an internal wall of said flow pipe.

13. A method of retrieving a hollow device located in a flow pipe provided with a flow of fluids flowing into it by at least one stop means provided in said flow pipe, said method comprising the following steps:
- removing said at least one stop means from an interior of said flow pipe;
- inserting a driving means into a first end of said flow pipe located upstream of a point where said hollow device operates;
- allowing said driving means to be urged by said flow flowing in said flow pipe; and
- allowing said driving means to contact said hollow device, thereby displacing it towards a second end of said flow pipe where said driving means and said hollow device can both be retrieved.

14. A method according claim 13, wherein:
said at least one stop means comprises:
- a flanged spool provided with a first flange, said first flange being welded over an orifice drilled in an outer wall of said flow pipe, at a point where said hollow device operates, with an internal passage of said spool being substantially in registration with said orifice;
- a bonnet of a gate valve connected to a second flange of said flanged spool, said bonnet being provided with a stem and being also provided with a gate, said gate being connected to a first end of said stem, said bonnet being also provided with a packing set to seal said stem; and
- an actuating means connected to a second end of said stem, for driving said stem;
- whereby said actuating means is able to be driven in such a way that said stem provokes a movement of said gate radially outwardly of said flow pipe, thereby causing a removal of said gate from an interior of said flow pipe.

15. A method according to claim 14, wherein:
said driving means is a flexible pig.

16. A method according to claim 15, wherein:
said flexible pig is a foam pig.

17. A method according to claim 16, wherein:
said flow pipe is an undersea flow pipe.

18. A method according to claim 17, wherein:
said hollow device is provided with an external sealing system to prevent fluid from passing between a fortuitous space formed between an external wall of said hollow device and an internal wall of said flow pipe.

19. A method according claim 13, wherein:
said at least one stop means comprises:
- a flanged spool provided with a first flange, said first flange being welded over an orifice drilled in an outer wall of said flow pipe, at a point where said hollow device operates, with an internal passage of said spool being substantially in registration with said orifice;
- a first flange of a first gate valve connected to a second flange of said flanged spool;
- a bonnet of a second gate valve connected to a second flange of said first gate valve, said bonnet being provided with a stem and being also provided with a gate, said gate being connected to a first end of said stem, said bonnet being provided with a packing set to seal said stem; and
- an actuating means connected to a second end of said stem, for driving said stem;
- whereby said actuating means is able to be driven in such a way that said stem provokes movement of said gate of said second gate valve radially outwardly of said flow pipe, thereby causing a removal of said gate from an interior of said flow pipe.

20. A method according claim 19, wherein:
said first gate valve is closed after said gate of said second gate valve is removed from said interior of said flow pipe.

21. A method according to claim 20, wherein:
said flow pipe is an undersea flow pipe.

22. A method according to claim 21, wherein:
said hollow device is provided with an external sealing system to prevent fluid from passing between a fortuitous space formed between an external wall of said hollow device and an internal wall of said flow pipe.

* * * * *